(No Model.)

J. BISSETT.
LUBRICATOR.

No. 294,720.　　　　　　　Patented Mar. 4, 1884.

Witnesses,
Robert Everett,
Chas. J. Hyer

Inventor,
Jean Bissett,
By James L. Norris
Atty

UNITED STATES PATENT OFFICE.

JEAN BISSETT, OF HOUSTON, TEXAS, ASSIGNOR OF ONE-HALF TO TOBIAS BUFFINGER, OF SAME PLACE.

LUBRICATOR.

SPECIFICATION forming part of Letters Patent No. 294,720, dated March 4, 1884.

Application filed January 3, 1884. (No model.)

*To all whom it may concern:*

Be it known that I, JEAN BISSETT, a citizen of the United States, residing at Houston, in the county of Harris and State of Texas, have invented new and useful Improvements in Lubricators, of which the following is a specification This invention relates to improvements in that class of lubricators wherein the oil reservoir or vessel is provided with a discharge-pipe passing through the bottom to the point of delivery, and rising within the reservoir to near its top, the steam rising in such pipe condensing and falling by gravity to the bottom of the reservoir, thus displacing the oil, and causing it to rise and flow down through the pipe to the parts to be lubricated.

The object of my invention is to provide novel and efficient means for supplying the lubricant to the reservoir, which I accomplish in the manner and by the means hereinafter described and claimed, reference being had to the accompanying drawings, illustrating my invention, in which—

Figure 1:
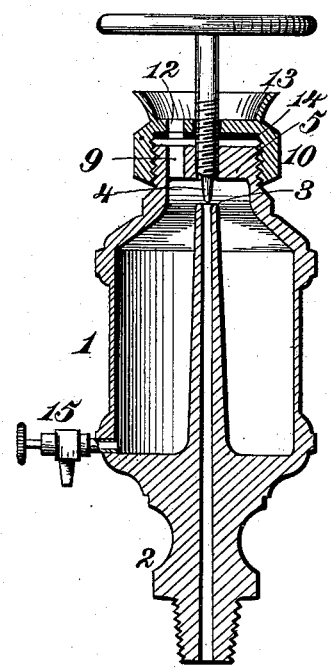
Figure 2:
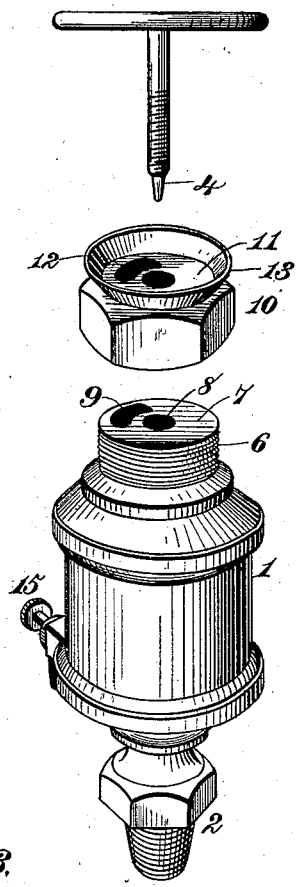
Figure 3:
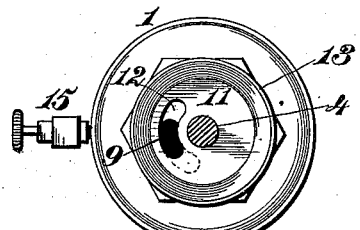

Figure 1 is a vertical central sectional view of a lubricator embodying my invention; Fig. 2, a perspective view with the parts detached, and Fig. 3 a top plan view with the wheel of the valve-stem omitted.

Referring to the drawings, the number 1 indicates the oil reservoir or vessel, having the discharge-pipe 2 passing from its bottom, for attachment to or connection with the parts to be lubricated, said pipe rising within the reservoir to a point adjacent to its top, and provided with a conical valve-seat, 3, to which the tapered end 4 of the valve-stem is adapted. The top of the reservoir is in the form of an annular neck or shank, 5, having external screw-threads, 6, and a top wall, 7, the latter having a central orifice, 8, for the passage of the valve-stem, and a slot, 9, at one side of the central orifice, through which slot the oil passes to fill the reservoir. Upon the threaded shank is arranged a screw-nut, 10, having a top wall, 11, provided with a central orifice for the valve-stem, and a slot, 12, for registering with the slot 9, whereby the oil can be supplied to the reservoir and the nut then rotated to move its slot out of coincidence with the other one, thereby effectually closing the reservoir. From the top wall of the nut rises a continuous flaring flange or rim, 13, circular in outline, which imparts a cup shape to the top of the nut, prevents the waste of oil, and greatly facilitates its ready passage to the slots before alluded to, through which the oil passes to the reservoir when such slots register. The exterior of the nut is hexagonal or other angular shape, so that a wrench can be used to turn it should it become too tight to be moved by hand.

A properly-perforated packing-disk, 14, is interposed between the top wall of the shank and the wall of the nut, to provide a tight joint and prevent escape of steam or oil when the lubricator is in operation.

The device is exceedingly simple in construction and convenient and efficient in use, while all waste is avoided and a straight way provided for the passage of the oil from the reservoir.

In operation, if the reservoir requires replenishing, the valve 4 is caused to close the upper end of the discharge-pipe 2. The cock 14 at the bottom of the reservoir is opened to permit the water of condensation to escape. This cock is then closed, and the screw-nut 10 is turned to cause its slot 12 to register with the slot 9 in the top wall of the screw-shank, after which the oil is poured into the cup-shaped top of the screw-nut, from whence it passes through the slots until the reservoir is filled, or nearly so. The nut is then turned to move its slot out of coincidence with the other, which brings the nut and packing tightly down to prevent leakage from the reservoir, and the valve-stem is finally adjusted to open the discharge-pipe, when the device will perform its usual functions.

The lubricator can be placed with advantage in such positions where space is limited, and is useful in air-brakes for cars, locomotives, and other places where a self-feeding lubricator is desired.

Having thus described my invention, what I claim is—

1. The combination, with an oil-reservoir having a shank provided with a perforated top, of the rotating nut fitted over the shank, and having a cup-shaped top and a perforated wall, substantially as described.

2. The combination, with a reservoir having a screw-threaded shank provided with a perforated top wall, of the screw-nut on the shank, having a cup-shaped top and a perforated wall, substantially as described.

3. The combination of a reservoir having a screw-threaded shank provided with a top wall having a central orifice and a side perforation, the screw-nut having the rim or flange, and a wall provided with a central orifice and a side perforation, and the valve-stem passing through the said central orifice, substantially as described.

4. The combination of a reservoir having a screw-threaded shank provided with a perforated top wall, the screw-nut fitted on the shank, and having a perforated top wall, and the packing-disk arranged between the two walls, substantially as described.

In testimony whereof I have hereunto set my hand in the presence of two subscribing witnesses.

JEAN BISSETT.

Witnesses:
  A. BRUNNER,
  TOM BUSOM.